United States Patent
Ritter et al.

(10) Patent No.: US 9,668,412 B2
(45) Date of Patent: Jun. 6, 2017

(54) HARVESTING HEAD HEIGHT CONTROL CIRCUIT

(71) Applicant: DEERE & COMPANY, Moline, IL (US)

(72) Inventors: Aaron S Ritter, Milan, IL (US); Bruce A Coers, Hillsdale, IL (US); Dustin D Deneault, Leclaire, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/701,773

(22) Filed: May 1, 2015

(65) Prior Publication Data

US 2016/0316624 A1 Nov. 3, 2016

(51) Int. Cl.
*A01D 41/14* (2006.01)
*A01D 41/127* (2006.01)

(52) U.S. Cl.
CPC ......... *A01D 41/141* (2013.01); *A01D 41/127* (2013.01)

(58) Field of Classification Search
CPC .. A01D 41/127; A01D 41/141; A01D 41/145; A01D 34/246; A01D 34/283
See application file for complete search history.

(56) References Cited

U.S. PATENT DOCUMENTS

| | | | |
|---|---|---|---|
| 7,661,251 B1 * | 2/2010 | Sloan | A01D 41/145 56/10.2 E |
| 8,973,342 B2 * | 3/2015 | Ritter | A01D 75/182 460/6 |
| 9,148,998 B2 * | 10/2015 | Bollin | A01D 41/141 |
| 9,345,191 B2 * | 5/2016 | Kohlhase | A01D 34/008 |
| 2003/0074876 A1 | 4/2003 | Patterson | |
| 2015/0377945 A1 * | 12/2015 | Schlipf | G01R 1/206 324/503 |
| 2016/0007531 A1 * | 1/2016 | Schlipf | A01D 41/141 56/10.2 E |

FOREIGN PATENT DOCUMENTS

| | | |
|---|---|---|
| CA | 2665589 A1 | 11/2010 |
| EP | 2695511 A1 | 2/2014 |
| EP | 2774472 A2 | 9/2014 |
| EP | 2842407 A1 | 3/2015 |
| EP | 2845462 A1 | 3/2015 |

OTHER PUBLICATIONS

European Search Report in foreign counterpart application No. 16167265.4, dated Oct. 11, 2016 (7 pages).

* cited by examiner

*Primary Examiner* — John G Weiss (57) ABSTRACT

A harvesting head height control circuit (162) for controlling the height of an articulated harvesting head (104) that is supported on a combine harvester (102) during harvesting in an agricultural field includes an ECU (164) configured to raise and lower the portions of the articulated harvesting head. The ECU (164) receives signals indicating the magnitude of a rearward force acting upon the articulated harvesting head and automatically changes the commanded operating height of the articulated harvesting head (104).

10 Claims, 6 Drawing Sheets

HARVESTING HEAD HEIGHT CONTROL CIRCUIT

RELATED APPLICATIONS

This application is related to U.S. patent application Ser. No. 14/014,672, filed Aug. 30, 2013, entitled "Articulated Harvesting Head Load Sensor Arrangement". This application is also related to U.S. patent application Ser. No. 13/940,311, filed Jul. 12, 2013, entitled "Articulated Harvesting Head Ground Force Control Circuit". Both of these applications are incorporated herein by reference for all that they teach.

FIELD OF THE INVENTION

This invention relates to agricultural harvesting equipment. More particularly, it relates to agricultural harvesting heads. Even more particularly, it relates to articulated agricultural harvesting head and circuits for controlling or limiting the force applied by the ground to the harvesting head.

BACKGROUND OF THE INVENTION

Agricultural harvesting heads such as draper platforms are designed to follow closely along the ground as they harvest crops. To ensure that they follow the ground closely, they are configured to contact the ground and apply a slight ground force to the ground or, alternatively, to travel slightly over the surface of the ground without making contact.

Hydraulic and electric circuits are typically provided to ensure that only a small portion of their weight is actually pressed against the ground. As the ground rises and falls underneath the agricultural harvesting head, the position of the agricultural harvesting head is adjusted up and down with respect to the agricultural combine on which the agricultural harvesting head is supported. This permits the agricultural harvesting head to adjust to changing terrain.

In recent years, articulated agricultural harvesting heads have been designed. Articulated heads comprise two or more elongated sections that are hinged to each other. As the terrain changes, each section is designed to rise and fall with respect to the ground independently of the other sections. In a three-section articulated agricultural harvesting head, for example, the two end sections are hingeably connected to a center section. The center section is supported on the agricultural combine itself. The two outer hinged sections are supported on the ground, and also are supported on the center section itself.

In CA 2,665,589 A1, the outer hinged sections of the agricultural harvesting head are supported on wheels. As the terrain changes, the terrain pushes against the wheels, which in turn raises and lowers the outer hinged sections with respect to the center section.

In US 2003/0074876 A1, an arrangement of linkages, levers, and springs are used to couple the outer sections of the agricultural harvesting head to the central section.

The Geringhoff company has a draper called "Triflex" that uses an accumulator (a hydraulic spring) to control the downforce applied to the ground.

One problem with all of these arrangements is their inability to respond quickly to rapid changes in terrain. As the terrain changes, it rises up and occasionally hits the bottom of the agricultural harvesting head. When this happens, the ground exerts not only an upward force but rearward forces as well. Furthermore, changes in crop thickness can also increase the rearward force acting upon the agricultural harvesting head. When these rearward forces act upon the sides of the agricultural harvesting head, particularly when it is a wide harvesting head, they can be so substantial that they damage the harvesting head or the combine that supports it. This can occur, for example, by pushing one side or the other of the harvesting head rearward, and bending the feederhouse, which is typically not designed to be twisted to one side or the other.

As the crop gets thicker and harder to cut, the operator typically increases the commanded operating height of the agricultural harvesting head. In this context, the "commanded operating height" is the set point or reference height to which the automatic header height control (AHHC) circuit tries to maintain the agricultural harvesting head above the ground. In this manner, the operator reduces the rearward load acting upon the harvesting head and thus, the risk of damage to the agricultural harvesting head due to sudden increases in rearward load. As the terrain under the agricultural harvesting head fluctuates, the automatic header height control circuitry will try to maintain this commanded operating height of the head above the ground.

Conversely, as the crop to be cut gets lighter (i.e. thinner) and easier to cut, the operator typically decreases the commanded operating height of the agricultural harvesting head, thereby permitting the agricultural harvesting head to cut closer to the ground. Since lighter crop growth exerts smaller rearward forces on the agricultural harvesting head, the agricultural harvesting head can be operated closer to the ground, thereby harvesting more crop closer to the ground.

It is not possible for the operator to continually adjust the commanded operating height of the agricultural harvesting head. It is too time consuming.

What is needed, therefore, is an improved arrangement for supporting an agricultural harvesting head that reduces the risk of damage due to excessive contact with the ground and dense crop that acts in a rearward direction.

It is an object of this invention to provide such an arrangement.

SUMMARY OF THE INVENTION

In accordance with one aspect of the invention, a control system monitors a rearward force acting on one or both sides of an agricultural harvesting head, and changes the commanded operating height automatically in response to the rearward force.

As the rearward force increases, the control system increases the commanded operating height. As the rearward force decreases, the control system decreases the commanded operating height. The "commanded operating height" means the distance between the ground and the bottom of the agricultural harvesting head that the control system uses is a target. As the ground rises and falls, the control system is configured to maintain the agricultural harvesting head at the commanded operating height.

The commanded operating height is the set point at which the automatic header height control system tries to maintain the height of the agricultural harvesting head above the ground.

In accordance with another aspect of the invention, a harvesting head height control circuit (162) is provided for controlling the height of an articulated harvesting head (104) that is supported on a combine harvester (102) during harvesting in an second signalagricultural field, the articulated harvesting head (104) including a center section (146), a left section (144), and a right section (148), wherein the left section (144) is coupled to the center section (146) and extends leftward therefrom, wherein the right section (148) is coupled to the center section (146) and extends rightward therefrom, wherein a first actuator (158) is coupled to the to the left section (144) to raise the left section (144) with respect to the center section (146), wherein a second actuator (160) is coupled to the right section (148) to raise the right section (148) with respect to the center section (146). The harvesting head height control circuit (162) comprises an ECU (164) coupled to the first actuator (158) to raise and lower the left section (144), and coupled to the second actuator (160) to raise and lower the right section (148); a first load sensor (149) coupled to the ECU (164) and disposed to sense a first force acting rearwardly against the left section (144) and configured to generate a first signal indicative of the first force; and a second load sensor (151) coupled to the ECU (164) and disposed to sense a second force acting rearwardly against the right section (148) and configured to generate a second signal indicative of the second force, wherein the ECU (164) is configured to receive the first signal and the second signal and to responsively raise and lower the left section (144) and the right section (148) based at least on a magnitude of the first signal and the second signal.

The harvesting head height control circuit may further comprise a first header height sensor (145, 147) that is configured to sense a first height of a portion of the articulated harvesting head (104) with respect to the agricultural field and to responsively generate a signal indicative of the first height.

The ECU may be configured to control the first height of a portion of the articulated harvesting head to a commanded operating height.

The ECU may automatically changes the commanded operating height based upon at least one of the first signal and the second signal.

The ECU may be configured to increase the commanded operating height when at least one of the first signal and the second signal increases above a first threshold signal level.

The ECU may be configured to maintain the commanded operating height at a predetermined commanded operating height when at least one of the first signal and the second signal is below a first threshold signal value.

The harvesting head height control circuit may further comprise an operator input device (143) that is configured to respond to operator actuation and to transmit the predetermined commanded operating height to the ECU (164).

The ECU may be configured to stop forward travel of the combine harvester (102) when at least one of the first signal and the second signal increases above a second threshold signal level.

The second threshold signal level maybe greater than the first threshold signal level.

The ECU may be coupled to an operator display device (169), and further wherein the ECU (164) may be configured to signal the operator display device (169) to display a message indicating that the combine harvester (102) has been stopped because at least one of the first signal and the second signal increased above the second threshold signal level.

In accordance with another aspect of the invention, a method of controlling an above-ground height of an agricultural harvesting head (104), wherein the agricultural harvesting head is supported on a self-propelled agricultural vehicle (102) as the self-propelled agricultural vehicle (102) travels through a field harvesting crops, the method comprising: reading a first signal of a first sensor (149, 151), wherein the first signal indicates a rearward load acting upon the agricultural harvesting head (104); numerically deriving (504, 506, 508) a commanded operating height from at least the first signal; reading (502) a second signal of a second sensor (145, 147), wherein the second signal indicates an actual height of the agricultural harvesting head above the ground; calculating (518) an error signal equal to the difference between the actual height and the commanded operating height; and executing (518) a feedback control loop to control the above-ground height of the agricultural harvesting head using at least the error signal as an input to the feedback control loop.

The rearward load may be applied to the agricultural harvesting head (104) by the crops being harvested, by the ground, or by both, as a result of their contact with the agricultural harvesting head (104) in resistance to forward movement of the agricultural harvesting head (104) through the field harvesting crops.

DETAILED DESCRIPTION

The term "side-to-side", "sideways", "laterally" or "lateral" refer to a direction that is horizontal and generally parallel to the longitudinal extent of the agricultural harvesting head itself. This direction is perpendicular to a direction of travel "V" of the machine as it travels through the field harvesting crops. The terms "in front of", "front", "forward", "fore" and the like refer to the direction of travel "V". The terms "back", "rear", "behind", "to the rear of" and the like refer to a direction opposite to the direction of travel "V".

The term "commanded operating height" refers to a set point height at which an automatic header height control circuit (e.g. a control arrangement such as a PID controller) is configured to maintain the agricultural harvesting head above the ground. The commanded operating height is a target or set point height.

Figure 1:
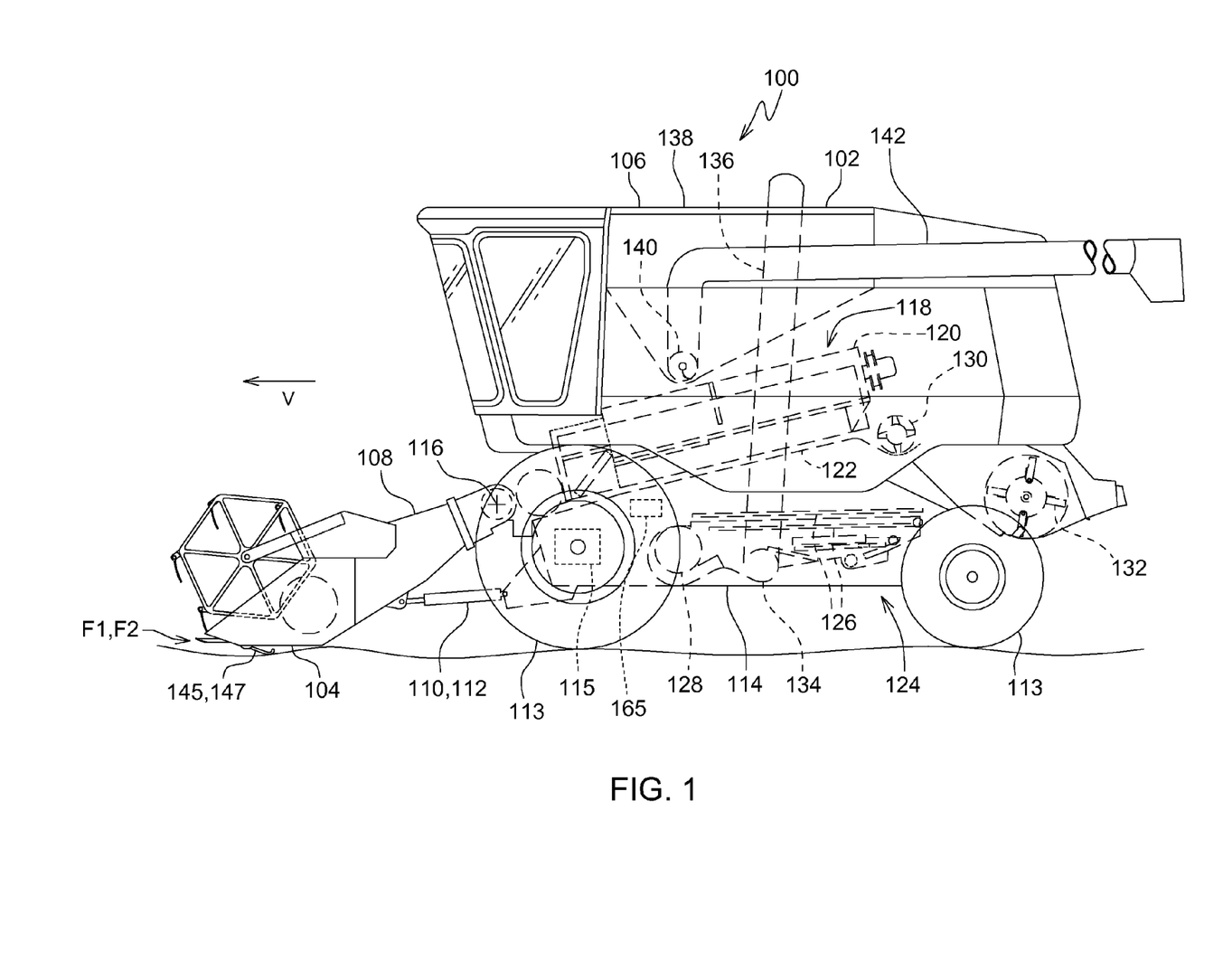
FIG. 1 is a side view of a combine harvester and agricultural harvesting head in accordance with the present invention.

FIG. 1 illustrates in FIG. 1, an agricultural harvesting vehicle 100 includes a combine harvester 102 and an agricultural harvesting head 104 supported on the front of the combine harvester 102.

The combine harvester includes a combine harvester vehicle 106 and a feederhouse 108 pivotally coupled to the front of the combine harvester vehicle 106.

A first actuator 110 and a second actuator 112 are coupled to and between the feederhouse 108 and the chassis 114 to support the forward end of the feederhouse 108 and the agricultural harvesting head 104 above the ground. The chassis is supported on wheels 113 that are driven by hydraulic motors 115 for travel over the ground.

When the first actuator 110 and the second actuator 112 are extended, the forward end of the feederhouse 108 and the agricultural harvesting head 104 are raised upward, pivoting clockwise (in FIG. 1) about a pivot joint 116 that couples the feederhouse 108 to the chassis 114.

When the first actuator 110 and the second actuator 112 are retracted, the forward end of the feederhouse 108 and the agricultural harvesting head 104 are lowered, pivoting counterclockwise (in FIG. 1) about the pivot joint 116.

Thus, by extending and retracting the first actuator 110 and the second actuator 112, the height of the feederhouse 108 and the agricultural harvesting head 104 can be varied. Furthermore, merely changing the hydraulic fluid pressure in the first actuator 110 and the second actuator 112 will change the amount of downforce exerted by the agricultural harvesting head 104 against the ground. As the hydraulic fluid pressure in the first actuator 110 and the second actuator 112 increases, the downforce applied by the agricultural harvesting head 104 to the ground will decrease. As the hydraulic fluid pressure in the first actuator 110 and the second actuator 112 decreases, the downforce applied by the agricultural harvesting head 104 to the ground will increase.

In an alternative arrangement, the first actuator 110 and the second actuator 112 can be electric or pneumatic devices such as linear or rotary motors.

The combine harvester vehicle 106 receives crop cut by the agricultural harvesting head 104 and conveys it into a threshing system 118. The threshing system 118 includes a rotor 120 that rotates against the concave 122. This separates the grain from the material other than grain (MOG). The grain falls downward into a cleaning system 124. The cleaning system 124 includes at least one sieve or chaffer 126. The cleaning system 124 also includes a fan 128 that blows air through the sieve or chaffer 126. This airflow levitates light MOG and carries it rearward where it is deposited on the ground.

A re-thresher 130 is provided at the rear of the threshing system 118 to receive the MOG separated from the grain in the threshing system 118. Grain that is further separated from the MOG in the re-thresher 130 drops into the cleaning system 124. The MOG leaves the threshing system 118 and is conveyed backward into a chopper 132, which throws the MOG onto the ground behind the combine harvester vehicle 106.

The grain that is cleaned in the cleaning system 124 is carried to an auger 134 that carries the clean grain to one side of the combine harvester vehicle 106. An elevator 136 receives the clean grain from the auger 134 and lifts the clean grain upward depositing it into a grain tank 138.

Periodically, an unloading vehicle such as a grain truck or grain cart will travel alongside the combine harvester vehicle 106 and an auger 140 in the grain tank will unload the grain tank 138 through an elongate outlet 142. The elongate outlet 142 is pivoted outward from the combine harvester vehicle 106 to extend over the grain truck or grain cart which receives the clean grain and carries it away for storage.

Figure 2:
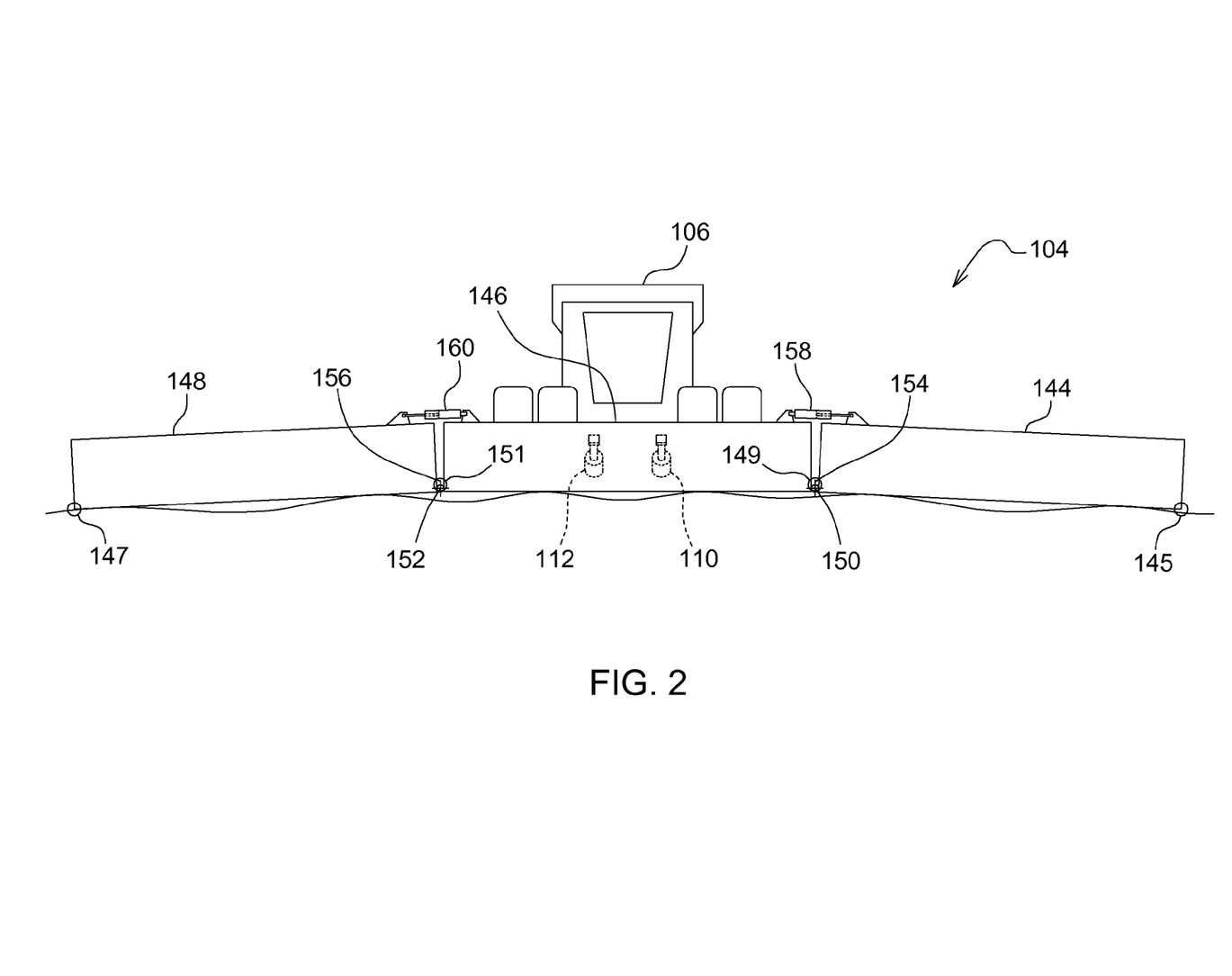
FIG. 2 is a front view of the arrangement of FIG. 1.

As shown in FIG. 2, the agricultural harvesting head 104 comprises three sections, a left section 144, a center section 146, and a right section 148. The left section 144 is hingeably connected to the center section 146 by a hinge joint 150. The right section 148 is hingeably connected to the center section 146 by a hinge joint 152. The hinge joint 150 and the hinge joint 150 to constrain the left section 144 and the right section 148 to pivot with respect to the center section 146 about a first generally horizontal and forwardly extending axis 154 and about a second generally horizontal and forwardly extending axis 156, respectively.

A height sensor 145 is disposed to detect a height of the left section 144 with respect to the ground. A height sensor 147 is disposed to detect the height of the right section with respect to the ground. The height sensor 145 and the height sensor 147 are supported on the left section 144 and the right section 148, respectively. The height sensor 145 and the height sensor 147 are configured to provide a signal indicative of the height of the left section 144 and the right section 148, respectively, with respect to the ground.

The height sensors 145, 147 may be mechanical sensors, such as a sensing element fixed to the agricultural harvesting vehicle 100 that is coupled to a pivoting arm (e.g. FIG. 1) that pivots up and down as the agricultural harvesting head 104 moves closer to enforce or from the ground. They may be noncontact range sensors, such as laser sensors, radar sensors, or ultrasonic sensors. In one arrangement, the height sensors are fixed to the left section 144, the center section 146, or the right section 148.

A load sensor 149 is provided to generate a signal indicative of a rearward force "F1" acting upon the left section 144. A load sensor 151 is provided to generate a signal indicative of a rearward force "F2" acting upon the right section 148.

In one arrangement, the load sensor 149 is a load pin functioning as a hinge pin of the hinge joint 150, and the load sensor 151 is a load pin functioning as a hinge pin of the hinge joint 152. In this arrangement, as the force "F1" and the force "F2" change, the shear force acting upon the load sensor 149 and the load sensor 151, respectively, correspondingly changes. This shear force is proportional to the force "F1" and the force "F2" and is detected by strain gauges disposed inside the load/hinge pins. An example of this load pin/hinge pin arrangement can be seen in U.S. patent application Ser. No. 14/014,672, in which the load pin/hinge is item 162.

The rearward force "F1" and a rearward force "F2" are generated by pressure of the crop, ground, or other material acting against the left section 144 and the right section 148 as the agricultural harvesting vehicle 100 is driven forward to the field harvesting crop. The crop, ground, or other material drags against the left section 144 and the right section 148 as the vehicle is driven forward, pushing rearward against the left section 144 and a right section 148.

A third actuator 158, here shown as a hydraulic cylinder, is attached to and between the left section 144 and the center section 146.

When the third actuator 158 extends, it permits the left section 144 to pivot downwardly (i.e. clockwise in FIG. 2). When the third actuator 158 retracts, it pivots the left section 144 upwardly (i.e. counterclockwise in FIG. 2).

When the fourth actuator 160 extends, it permits the right section 148 to pivot downwardly (i.e. counterclockwise in FIG. 2). When the fourth actuator 160 retracts, it pivots the right section 148 upwardly (i.e. clockwise in FIG. 2).

When hydraulic pressure to the third actuator 158 is increased, it reduces the downforce exerted by the left section 144 against the ground. When hydraulic pressure to the third actuator 158 is decreased, it increases the downforce exerted by the left section 144 against the ground.

When hydraulic pressure to the fourth actuator 160 is increased, it reduces the downforce exerted by the right section 148 against the ground. When hydraulic pressure to the fourth actuator 160 is decreased, it increases the downforce exerted by the right section 148 against the ground.

Figure 3:
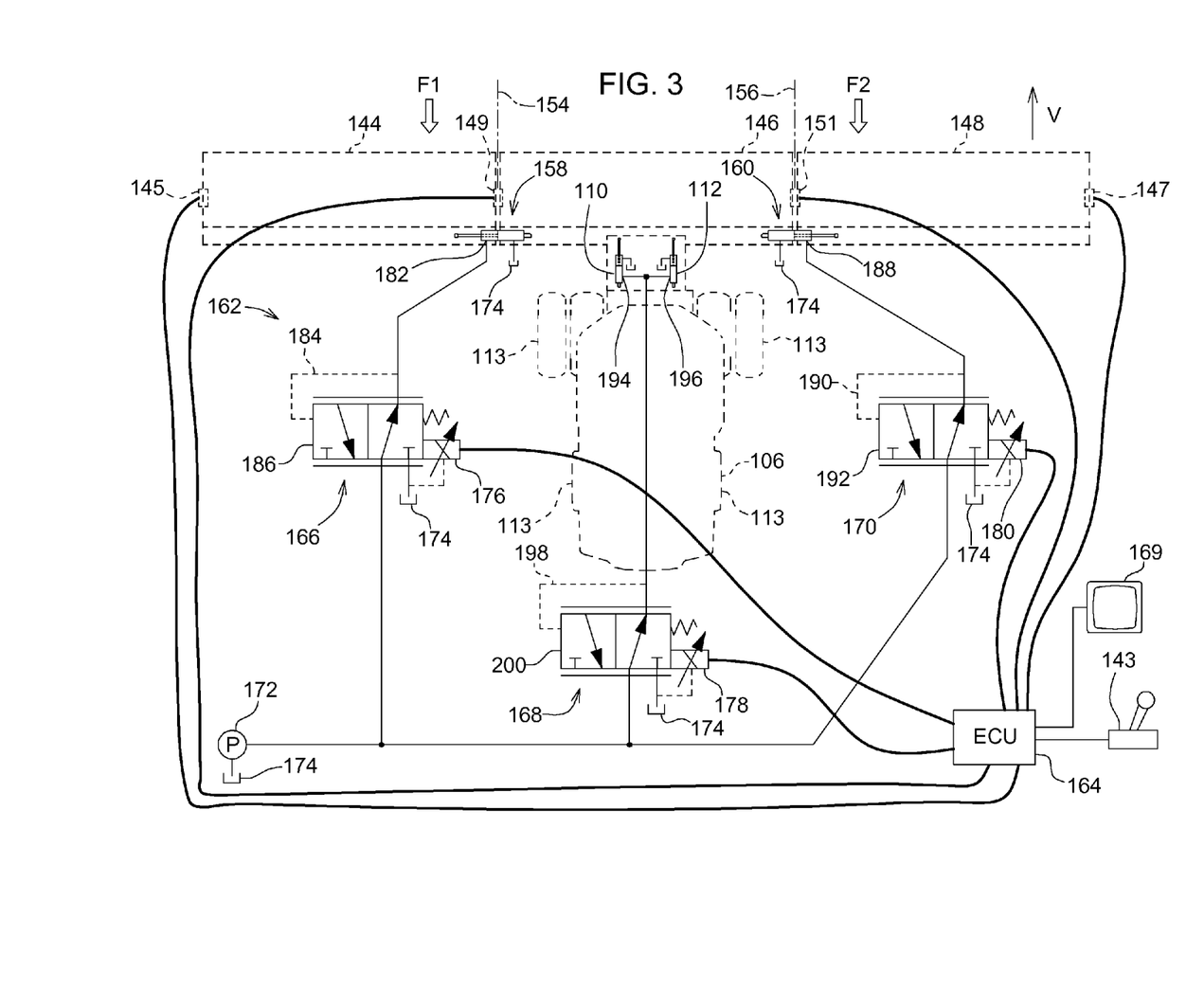
FIG. 3 is a plan view of the arrangement of FIGS. 1-2 with a first ground force control circuit arrangement.

In FIG. 3, a header height control circuit 162 comprises an ECU 164, a first hydraulic control valve 166, a second hydraulic control valve 168, a third hydraulic control valve 170, an operator input device 143, the height sensor 145, the height sensor 147, the load sensor 149, and the load sensor 151.

The ECU 164 comprises a digital microprocessor or microcontroller coupled to a volatile digital memory (RAM), a nonvolatile memory (ROM), and a valve driver circuits. The ECU 164 may be a single ECU, or it may be multiple ECUs networked together using a serial or parallel communication bus to provide the capabilities described herein.

The ECU 164 is coupled to a hydraulic valve 165, an operator input device 143, the height sensor 145, the height sensor 147, the load sensor 149, and the load sensor 151 to receive electronic signals therefrom. The ECU 164 is configured to receive the signal from the height sensor 145 which indicates the height of the left section 144 above the ground. The ECU 164 is configured to receive the signal from height sensor 147 which indicates the height of the right section 148 above the ground. The ECU 164 is configured to receive the signal from the load sensor 149 indicative of the force F1 generated by the ground acting rearward against the left section 144. The ECU 164 is configured to receive the signal from the load sensor 151 which indicates the force F2 generated by the ground acting rearward against the right section 148.

The header height control circuit 162 is connected to and controls the first actuator 110, the second actuator 112, the third actuator 158, and the fourth actuator 160. A hydraulic fluid pressure source 172 and a hydraulic fluid reservoir 174 are coupled to the header height control circuit 162 to complete the hydraulic circuit.

The first hydraulic control valve 166 is a pilot compensated proportional control valve actuated by a first solenoid coil 176. The first solenoid coil 176 is coupled to the ECU 164 to be controlled thereby.

The second hydraulic control valve 168 is a pilot compensated proportional control valve actuated by a second solenoid coil 178. The second solenoid coil 178 is coupled to the ECU 164 to be controlled thereby.

The third hydraulic control valve 170 is a pilot compensated proportional control valve actuated by a third solenoid coil 180. The third solenoid coil 180 is coupled to the ECU 164 to be controlled thereby.

The first hydraulic control valve 166 has a hydraulic fluid port that is coupled to the hydraulic fluid pressure source 172 to receive hydraulic fluid under pressure therefrom and to apply it to the hydraulic fluid port 182 of the third actuator 158 to apply hydraulic fluid under pressure to the Rod end of the third actuator 158.

When hydraulic fluid is forced into the third actuator 158, the third actuator 158 retracts, thereby lifting the left section 144. When hydraulic fluid is released from the third actuator 158, the third actuator 158 extends, thereby lowering the left section 144.

A pilot hydraulic line 184 is coupled to the hydraulic fluid port 182. The pressure in the pilot hydraulic line 184 is applied to one end of the spool 186 of the first hydraulic control valve 166.

Increasing hydraulic fluid pressure in the third actuator 158 tends to cause the spool 186 to shift to the right (in FIG. 3). This rightward movement of the spool 186 releases hydraulic fluid from the third actuator 158 and returns it to the hydraulic fluid reservoir 174.

Decreasing hydraulic fluid pressure in the third actuator 158 tends to cause the spool 186 to shift to the left (in FIG. 3). This leftward movement of the spool 186 connects the third actuator 158 to the hydraulic fluid pressure source 172, which tends to fill the third actuator 158 and increase the hydraulic fluid pressure in the third actuator 158.

Thus, when hydraulic fluid pressure increases in the third actuator 158, hydraulic fluid is automatically released from the third actuator 158 until the hydraulic fluid pressure returns to a pressure set point. Similarly, when hydraulic fluid pressure decreases in the third actuator 158, hydraulic fluid is automatically supplied to the third actuator 158 until hydraulic fluid pressure returns to the pressure set point.

In this manner, the pilot hydraulic line 184 and its interconnections with the rest of the circuit tend to maintain a constant hydraulic fluid pressure in the third actuator 158.

The pressure set point in the third actuator 158 is adjusted by the ECU changing the electrical current flowing through the first solenoid coil 176.

As the current flowing to the first solenoid coil 176 increases, the hydraulic fluid pressure in the third actuator 158 correspondingly and responsively increases. As the hydraulic fluid pressure in the third actuator 158 increases, the force of the left section 144 against the ground is correspondingly and responsively decreases. It does this since the increased hydraulic pressure in the third actuator 158 tends to lift the left section 144 off the ground. The increasing hydraulic pressure in the third actuator 158 transfers a portion of the weight of the left section 144 to the center section 146. This transfer of weight increases the ground force that the center section 146 applies against the ground.

The third hydraulic control valve 170 has a hydraulic fluid port that is coupled to the hydraulic fluid pressure source 172 to receive hydraulic fluid under pressure therefrom and to apply it to the hydraulic fluid port 188 of the fourth actuator 160 to apply hydraulic fluid under pressure to the Rod end of the fourth actuator 160.

When hydraulic fluid is forced into the fourth actuator 160, the fourth actuator 160 retracts, thereby lifting the right section 148. When hydraulic fluid is released from the fourth actuator 160, the fourth actuator 160 extends, thereby lowering the right section 148.

A pilot hydraulic line 190 is coupled to the hydraulic fluid port 188. The pressure in the pilot hydraulic line 190 is applied to one end of the spool 192 of the first hydraulic control valve 166.

Increasing hydraulic fluid pressure in the fourth actuator 160 tends to cause the spool 192 to shift to the right (in FIG. 3). This rightward movement of the spool 192 releases hydraulic fluid from the fourth actuator 160 and returns it to the hydraulic fluid reservoir 174.

Decreasing hydraulic fluid pressure in the fourth actuator 160 tends to cause the spool 192 to shift to the left (in FIG. 3). This leftward movement of the spool 192 connects the fourth actuator 160 to the hydraulic fluid pressure source 172, which tends to fill the fourth actuator 160 and increase the hydraulic fluid pressure in the fourth actuator 160.

Thus, when hydraulic fluid pressure increases in the fourth actuator 160, hydraulic fluid is automatically released from the fourth actuator 160 until the hydraulic fluid pressure returns to a pressure set point. Similarly, when hydraulic fluid pressure decreases in the fourth actuator 160, hydraulic fluid is automatically supplied to the fourth actuator 160 until hydraulic fluid pressure returns to the pressure set point.

In this manner, the pilot hydraulic line 190 and its interconnections with the rest of the circuit tend to maintain a constant hydraulic fluid pressure in the fourth actuator 160.

The pressure set point in the fourth actuator 160 is adjusted by the ECU changing the electrical current flowing through the third solenoid coil 180.

As the current flowing to the third solenoid coil 180 increases, the hydraulic fluid pressure in the fourth actuator 160 correspondingly and responsively increases. As the hydraulic fluid pressure in the fourth actuator 160 increases, the force of the right section 148 against the ground is correspondingly and responsively decreases. It does this since the increased hydraulic pressure in the fourth actuator 160 tends to lift the right section 148 off the ground. The increasing hydraulic pressure in the fourth actuator 160 transfers a portion of the weight of the right section 148 to the center section 146. This transfer of weight increases the ground force that the center section 146 applies against the ground.

The second hydraulic control valve 168 has a hydraulic fluid port that is coupled to the hydraulic fluid pressure source 172 to receive hydraulic fluid under pressure therefrom and to apply it to the hydraulic fluid port 194 of the first actuator 110 to apply hydraulic fluid under pressure to the cylinder end of the first actuator 110. The same hydraulic fluid port applies hydraulic fluid under pressure to the hydraulic fluid port 196 of the second actuator 112. Both the first actuator 110 and the second actuator 112 are coupled together in common to receive hydraulic fluid from and to send hydraulic fluid to the second hydraulic control valve 168.

When hydraulic fluid is forced into the first actuator 110 and the second actuator 112, the first actuator 110 and the second actuator 112 extend, thereby lifting the feederhouse 108, the center section 146, the left section 144, and the right section 148.

When hydraulic fluid is released from the first actuator 110 and the second actuator 112, the first actuator 110 and the second actuator 112 retract, thereby lowering the feederhouse 108, the center section 146, the left section 144, and the right section 148.

A pilot hydraulic line 198 is coupled to the hydraulic fluid port 194 and the hydraulic fluid port 196. The pressure in the pilot hydraulic line 198 is applied to one end of the spool 200 of the second hydraulic control valve 168.

Increasing hydraulic fluid pressure in the first actuator 110 and the second actuator 112 tends to cause the spool 200 to shift to the right (in FIG. 3). This rightward movement of the spool 200 releases hydraulic fluid from the first actuator 110 and the second actuator 112 and returns it to the hydraulic fluid reservoir 174.

Decreasing hydraulic fluid pressure in the first actuator 110 and the second actuator 112 tends to cause the spool 200 to shift to the left (in FIG. 3). This leftward movement of the spool 200 connects the first actuator 110 and the second actuator 112 to the hydraulic fluid pressure source 172, which tends to fill the first actuator 110 and the second actuator 112 and increase the hydraulic fluid pressure in the first actuator 110 and the second actuator 112.

Thus, when hydraulic fluid pressure increases in the first actuator 110 and the second actuator 112, hydraulic fluid is automatically released from the first actuator 110 and the second actuator 112 until the hydraulic fluid pressure returns to a pressure set point. Similarly, when hydraulic fluid pressure decreases in the first actuator 110 and the second actuator 112, hydraulic fluid is automatically supplied to the first actuator 110 and the second actuator 112 until hydraulic fluid pressure returns to the pressure set point.

In this manner, the pilot hydraulic line 198 and its interconnections with the rest of the circuit tend to maintain a constant hydraulic fluid pressure in the first actuator 110 and the second actuator 112.

The pressure set point in the first actuator 110 and the second actuator 112 is adjusted by the ECU changing the electrical current flowing through the second solenoid coil 178.

As the current flowing to the second solenoid coil 178 increases, the hydraulic fluid pressure in the first actuator 110 and the second actuator 112 correspondingly and responsively increases. As the hydraulic fluid pressure in the first actuator 110 and the second actuator 112 increases, the force of the center section 146 against the ground is correspondingly and responsively decreased. It does this since the increased hydraulic pressure in the first actuator 110 and the second actuator 112 tends to lift the center section 146 off the ground. The increasing hydraulic pressure in the first actuator 110 and the second actuator 112 transfers a portion of the weight of the center section 146 (and the left section 144 and the right section 148 which are supported on the center section 146) to the chassis 114 of the combine harvester vehicle 106. This transfer of weight decreases the ground force that the center section 146 applies against the ground.

In the arrangement of FIG. 3, the ECU 164 has the capability of independently controlling the downforce of the left section 144 against the ground and the downforce of the right section 148 against the ground.

In normal operation, however, the operator wants to have the same downforce of the left section 144 and the right section 148 against the ground. For this operator, there is no need to independently regulate the downforce of the left section 144 and the right section 148. For this reason, an alternative arrangement that uses fewer parts is provided and illustrated in FIG. 4.

Figure 4:
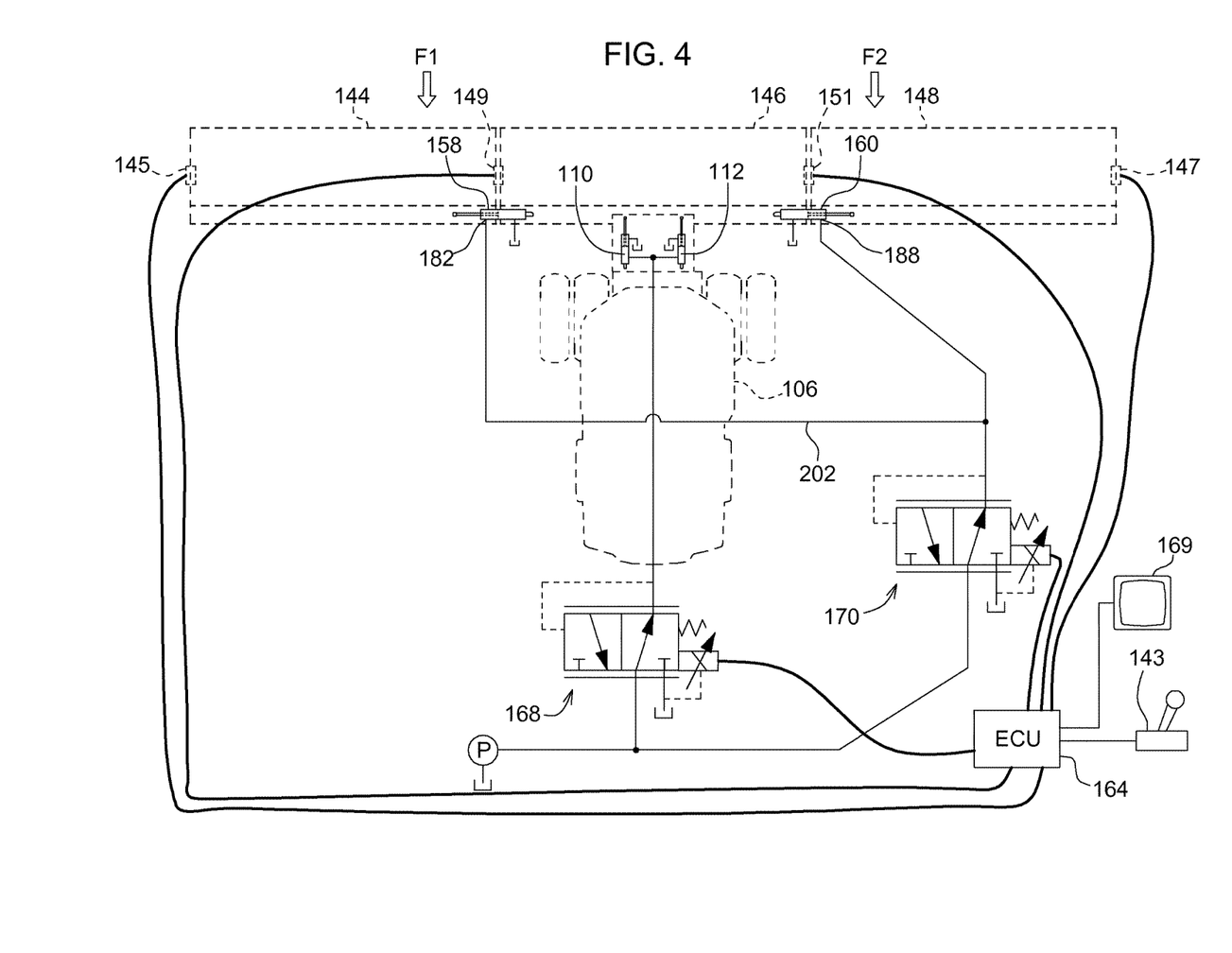
FIG. 4 is a plan view of the arrangement of FIGS. 1-2 with an alternative ground force control circuit arrangement.

In the arrangement of FIG. 4, instead of having a separate first hydraulic control valve 166 and third hydraulic control valve 170, a single hydraulic control valve 170' is provided that is coupled to both the third actuator 158 and the fourth actuator 160. The arrangement of FIG. 4 is alike in every functional and mechanical respect to the arrangement of FIG. 3, except the output of the single hydraulic control valve 170' is coupled in parallel to both the third actuator 158 in the fourth actuator 160. For that reason, we have not repeated the description of the third hydraulic control valve 170 herein.

One way the operator of the vehicle can change the ground force (and hence the operating height of the agricultural harvesting head 104) is by selecting a new height using the operator input device 143. The ECU 164 is configured to respond to any harvesting height commands received from the operator input device, and to change the ground force (and hence the operating height) accordingly.

In the discussion above with reference to FIGS. 1-4, the ECU 164 operates in a ground-following mode in which the nominal height of the agricultural harvesting head 104 above the ground is zero and the ground force (i.e. the pressure of the agricultural harvesting head 104 against the ground) is controlled by controlling the hydraulic fluid pressure applied to actuators 110, 112, 158, and 160.

In another mode of operation, the ECU 164 operates in and above-the-ground mode in which the agricultural harvesting head 104 is elevated above the ground and substantially its entire weight is supported by actuators 110, 112, 158, and 160. In this above-the-ground mode, the ECU 164 controls the height of the agricultural harvesting head 104 by periodically reading the signals from the height sensor 145 and the height sensor 147. If the signals from the sensors indicate that the agricultural harvesting head 104 is too high above the ground (i.e. above predetermined height set point) then the ECU 164 is configured to reduce the hydraulic fluid pressure applied to actuators 110, 112, 158, and 160, thereby lowering the agricultural harvesting head closer to the ground. The signals from the sensors indicate that the agricultural harvesting head 104 is too low above the ground (i.e. below a predetermined height set point) and then the ECU 164 is configured to increase the hydraulic fluid pressure applied to actuators 110, 112, 158 and 160, thereby raising the agricultural harvesting head higher above the ground. To do this, the ECU 164 may execute a generic feedback and control algorithm (for example a PID control algorithm) using a commanded operating height as a height set point, and using the signal from the height sensor 145 (which indicates the height of the left section 144 above the ground), and the signal from the height sensor 145 (which indicates the height of the right section 148 above the ground). In such an arrangement, two feedback and control algorithms are used, one algorithm using the difference between the commanded operating height and the height as indicated by the height sensor 145 as a left side error signal and controlling the height of the left section 144 by minimizing this left side error signal, and the other algorithm using the difference between the commanded operating height and the height as indicated by the height sensor 147 as a right side error signal and controlling the height of the right section 148 by minimizing this right side error signal. The manner in which the left section 144 and the right section 148 can be raised and lowered by controlling the valve 166, the valve 168, and the valve 170 is described above.

In this above-the-ground mode of operation, the ECU 164 is also programmed to automatically change the commanded operating height (which is used in the automatic height control process described in the previous paragraph) based upon rearward forces F1, F2 (illustrated in FIGS. 1, 3, 4) acting on the agricultural harvesting head 104. The rearward force F1 acts upon the left section 144, and the rearward force F2 acts upon the right section 148, respectively.

If the rearward forces F1, F2 become too great, they may damage the agricultural harvesting head 104 and/or the feederhouse 108. For this reason, the ECU 164 is configured to repeatedly and periodically sense the rearward forces F1, F2 and change the commanded operating height according to the magnitude of the rearward forces F1, F2.

If the rearward forces F1, F2 increase above a first load threshold, the ECU 164 is configured to increase the commanded operating height and thereby increase the height of the agricultural harvesting head 104 above the ground.

If the rearward forces F1, F2 exceed a second load threshold, the ECU 164 is configured to reduce the forward travel speed of the agricultural harvesting vehicle 100 through the field. In one arrangement, the forward travel speed of the agricultural harvesting vehicle 100 through the field is reduced to zero. In another arrangement, the forward travel of the agricultural harvesting vehicle 100 to the field is reduced to some speed above zero. In this manner, the agricultural harvesting vehicle 100 is configured to adjust the height of the agricultural harvesting head 104 and the speed of the agricultural harvesting vehicle 100 through the field based at least upon the rearward forces F1, F2 that act upon the agricultural harvesting head 104 in order to reduce or control the rearward forces F1, F2.

Figure 5:
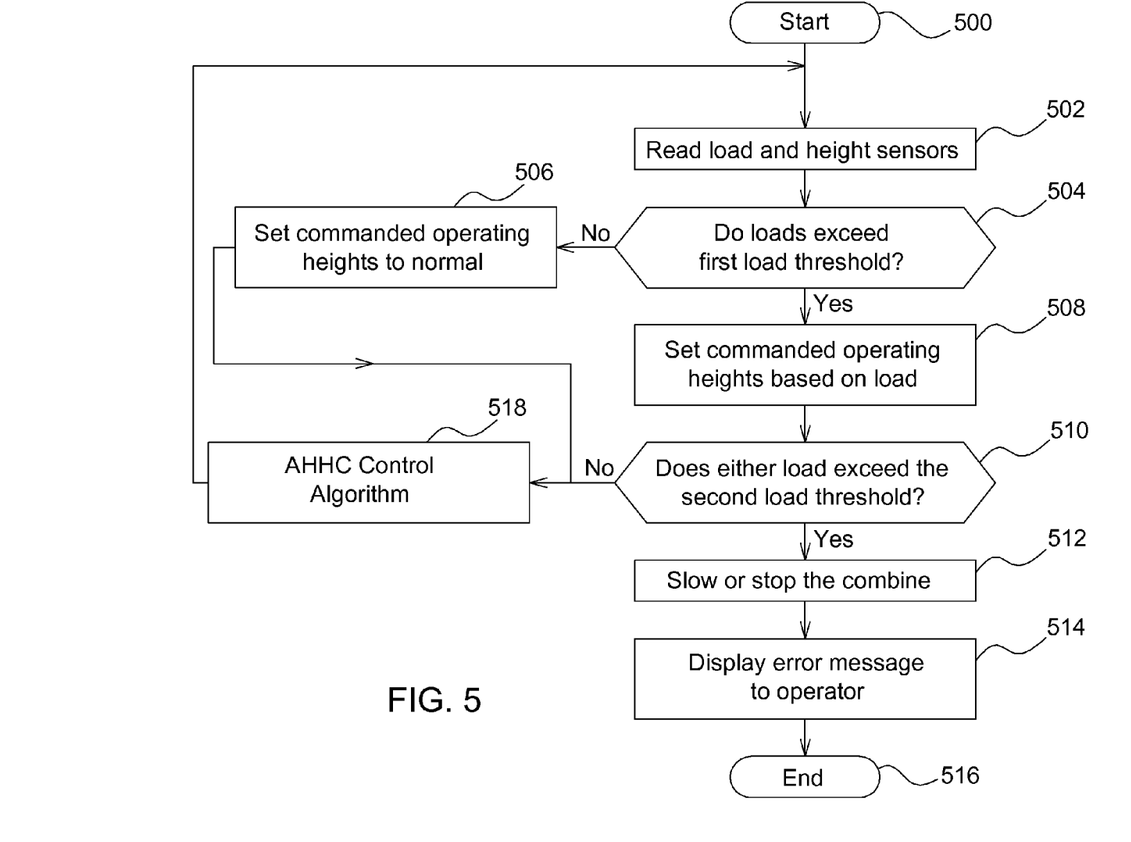
FIG. 5 is a flowchart of the steps performed by the control system of the arrangement of FIGS. 1-4.

This commanded operating height control process is illustrated in FIG. 5. In step 500, the process starts.

In step 502, the ECU 164 reads the height sensor 145, the height sensor 147, the load sensor 149, and the load sensor 151.

Figure 6:
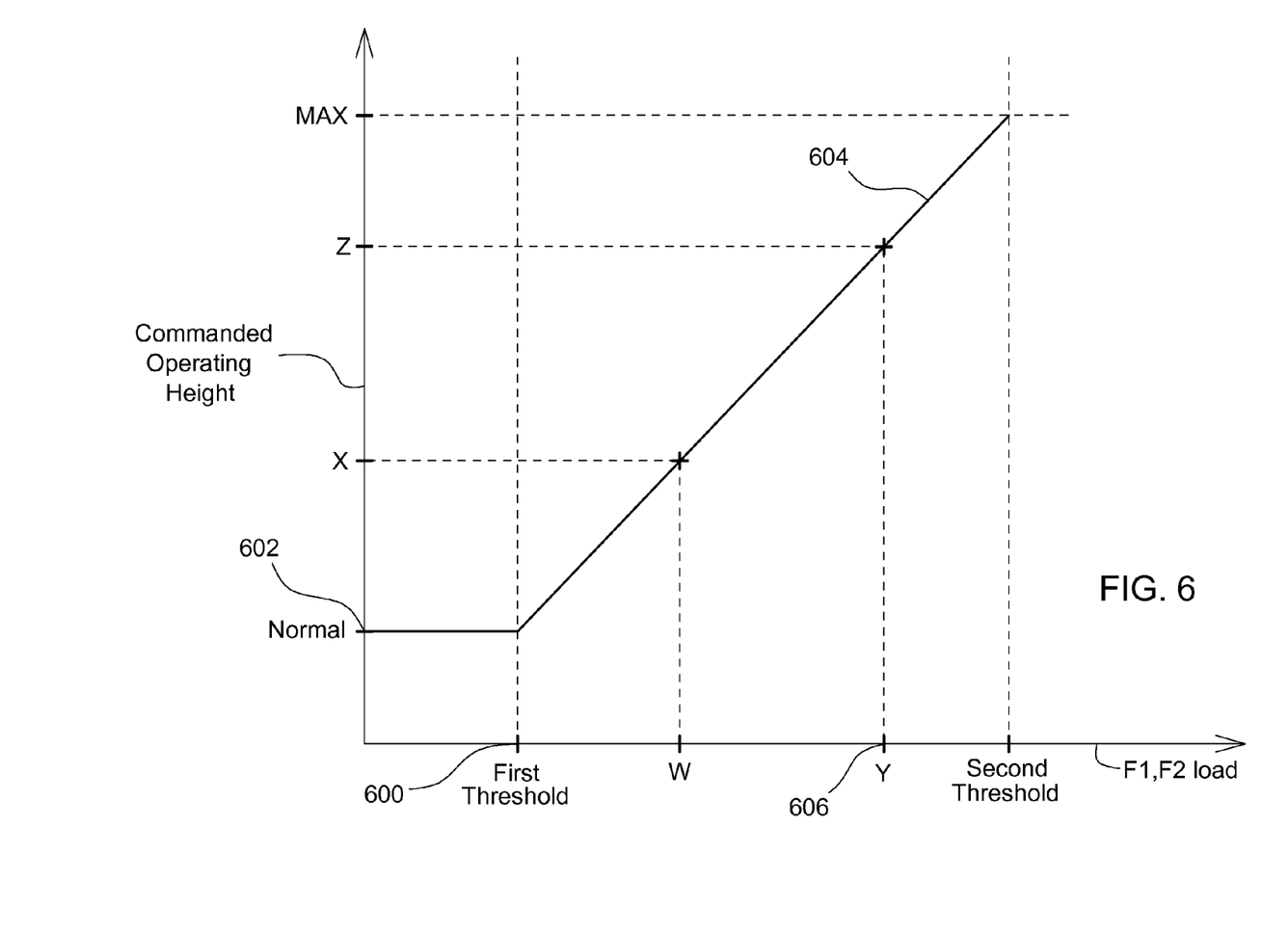
FIG. 6 is a chart showing the relationship between the commanded operating height and the load applied by the ground upon the left (F1) and/or right (F2) sections of the agricultural harvesting head.

In step 504, the ECU 164 compares the loads indicated by the signals from the load sensor 149 and the load sensor 151 with a first load threshold 600 (FIG. 6).

The ECU compares the load indicated by load sensor 149 with a first load threshold 600. If the load indicated by load sensor 149 does not exceed the first load threshold 600, the ECU 164 branches to step 506 and sets the commanded operating height of the section 144 to a normal height 602 (FIG. 6).

In a similar manner, the ECU compares the load indicated by load sensor 151 with the first load threshold 600. If the load indicated by load sensor 151 does not exceed the first load threshold 600, the ECU 164 branches to step 506 and sets the commanded operating height of the section 148 to the normal height 602 (FIG. 6).

In step 504, if the load indicated by load sensor 149 does exceed the first load threshold 600, the ECU 164 branches to step 508 and changes the commanded operating height of the section 144 based upon the load indicated by the load sensor 149.

Also in step 504, if the load indicated by load sensor 151 does exceed the first load threshold 600, the ECU 164 branches to step 508 and changes the commanded operating height of the section 148 based upon the load indicated by the load sensor 151.

The commanded operating heights of section 144 and 148 and their relationship to the loads indicated by load sensors 149 and 151, respectively, are shown in FIG. 6. For example (and referring to FIG. 6), a sensed load of magnitude "W" causes the ECU 164 to set the commanded operating height to "X", and a sensed load of magnitude "Y" causes the ECU 164 to set the commanded operating height to "Z". Other indicated loads versus commanded operating height pairs can be derived from the curve 604. The curve 604 may be stored in a memory circuit of the ECU 164 as a lookup table, an equation, parameters of an equation, vertices of a piecewise linearization, a B-tree, or other digital data structures used by microprocessors.

After executing step 508, the ECU 164 then proceeds to step 510 in which the ECU 164 compares the load indicated by load sensor 149 with a second load threshold 606 (see FIG. 6). The second load threshold 606 is higher than the first load threshold.

In a similar fashion, in step 510 the ECU 164 compares the load indicated by the load sensor 151 with the second load threshold 606.

If both the load indicated by the load sensor 149 and the load indicated by the load sensor 151 do not exceed the second load threshold 606, the ECU 164 then proceeds to execute step 518.

In step 518, the ECU 164 uses the commanded operating height of the left section 144 as the set point (a target height) for a first automatic header height control algorithm. In this first automatic header height control algorithm (executed by the ECU 164), the ECU 164 determines the first height error signal for the left section 144. The first height error signal is equal to the difference between the commanded operating height of the left section 144 and the actual height of the left section 144 (which actual height is indicated by the signal provided to the ECU 164 by height sensor 145). The ECU 164 calculates a valve control signal based at least upon the magnitude of this first height error signal and applies the valve control signal to valve 166, thereby controlling the height of the left section 144. Any changes in the height of the left section 144 feed back into the system by changing the signal provided by the height sensor 145

Thus, if the height of the left section 144 is less than the commanded operating height of the left section (which commanded operating height was previously calculated in step 508), the control signal applied to valve 166 will increase the pressure in the actuator 158 and thereby lift the left section 144. As this algorithm is repeatedly executed in the loop shown in FIG. 5, the effect will be to reduce the error signal to zero, and to maintain the height of the left section 144 (indicated by the height sensor 145) at the commanded operating height.

In a similar fashion (and also in step 518) the ECU 164 uses the commanded operating height of the right section 148 as the set point (a target height) for a second automatic header height control algorithm. In this second automatic header height control algorithm (executed by the ECU 164), the ECU 164 determines the second height error signal for the right section 148. The second height error signal is equal to the difference between the commanded operating height of the right section 148 and the actual height of the right section 148 (which actual height is indicated by the signal provided to the ECU 164 by height sensor 147). The ECU 164 calculates a valve control signal based at least upon the magnitude of this second height error signal and applies the valve control signal to valve 170, thereby controlling the height of the right section 148. Any changes in height of the wall right section 148 feed back into the system by changing the signal provided by the height sensor 147.

Thus, if the height of the right section 148 is less than the commanded operating height of the right section (which commanded operating height was previously calculated in step 508), the control signal applied to valve 170 will increase the pressure in the actuator 160 and thereby lift the right section 148. As this algorithm is repeatedly executed in the loop shown in FIG. 5, the effect will be to reduce the error signal to zero, and to maintain the height of the left section 144 (indicated by the height sensor 145) at the commanded operating height.

The first and second automatic header height control algorithms executed by the ECU 164 are therefore feedback control loops. The difference between the commanded operating heights of the sections and the actual heights of the sections as the error signal input to the feedback control loops, If, in step 510, either the load indicated by the load sensor 149 and the load indicated by the load sensor 151 exceeds the second load threshold 606, the ECU 164 then proceeds to execute step 512, and automatically stops (or slows) the agricultural harvesting vehicle 100 in its forward travel to the field. The ECU 164 is programmed to do this by signaling the hydraulic valve 165 (FIG. 1) which is coupled to the ECU 164 to thereby stop (or slow) hydraulic fluid flow to a hydraulic motor 115 (FIG. 1) coupled to the hydraulic valve 165. The hydraulic motor 115, is coupled to and drives at least one wheel 113 (FIG. 1).

After executing step 512, the ECU 164 proceeds to execute step 514, in which the ECU 164 transmits a signal to an operator display device 169 (FIG. 3) such as an LCD, CRT, or electroluminescent display) indicating that it has stopped (or slowed) the agricultural harvesting vehicle 100 because the second load threshold 606 was exceeded.

In the description above regarding FIG. 5, the ECU 164 is configured to independently set a commanded operating height of the left section 144 and the right section 148 based upon rearward loads acting on the left section 144 (i.e. load F1) and rearward loads acting on the right section 148 (i.e. load F2), respectively, The ECU 164 is also configured to independently control the operating height of the left section 144 and the right section 148 by using a first automatic header height control algorithm for the left section 144, and the second automatic header height control algorithm for the right section 148. This capability is provided by the embodiment of FIG. 3, which permits independent control of the height of the left section 144 and the right section 148.

FIG. 6 illustrates the relationship between the magnitudes of the rearward forces F1, F2 sensed by the load sensors 149 and 151, respectively, and the magnitude of the corresponding commanded operating heights that are commanded by the ECU 164 ("Commanded Operating Height" in FIG. 6).

From FIG. 6, as the rearward forces F1, F2 that act upon the agricultural harvesting head increase, the commanded operating height correspondingly increases between a first threshold load and a second threshold load. For rearward forces F1, F2 less than the first threshold load, the commanded operating height is constant and does not change.

The curve shown in FIG. 6 is a piecewise linearization represented by two line segments, the first line segment (from the origin to the first threshold) having a constant slope of zero, and the second line segment having a constant slope greater than zero. In an alternative arrangement, it can be upwardly curved such that the slope changes continuously (or discontinuously), or be in the form of a series of stepwise increasing line segments.

While this application discloses several ways to make and use the invention, the invention itself is defined by the claims and not by the specific devices shown and described herein. The specific devices shown herein are intended to enable the reader to understand the invention, and to enable the reader to make and use at least one example.

Those skilled in the art of agricultural equipment can easily see many changes that could be made that would still fall within the scope of the claims.

For example, for convenience we have illustrated the invention using a single ECU 164. The single ECU 164 illustrated herein could be replaced with several ECUs connected together over a communications network to share the information and collectively perform the functions described herein. There are so many potential combinations of ECUs and the ways they could be coupled to the sensors and actuators described herein that it would be confusing (if not impossible) to illustrate all of them. The term "ECU" as that term is used in this application means any number of ECUs that are connected together to communicate with each other and collectively perform the functions recited herein.

As another example, the height sensors are shown at the ends of the agricultural harvesting head 104. There are many other locations on the agricultural harvesting head 104 and on the combine harvester 102 where such sensors could be placed to detect the height of the agricultural harvesting head 104.

As another example, a specific valve and actuator arrangement is shown coupled to the ECU 164. There are many types of valves and actuators that could be used to raise and lower portions of the agricultural harvesting head 104. Unless a specific type or configuration of valve or actuator is described in the claims below, any of these arrangements would fall within the scope of the claims.

We claim:

1. A harvesting head height control circuit (162) for controlling the height of an articulated harvesting head (104) that is supported on a combine harvester (102) during harvesting in an agricultural field, the articulated harvesting head (104) including a center section (146), a left section (144), and a right section (148), wherein the left section (144) is coupled to the center section (146) and extends leftward therefrom, wherein the right section (148) is coupled to the center section (146) and extends rightward therefrom, wherein a first actuator (158) is coupled to the to the left section (144) to raise the left section (144) with respect to the center section (146), wherein a second actuator (160) is coupled to the right section (148) to raise the right section (148) with respect to the center section (146), wherein the harvesting head height control circuit (162) comprises:
- an ECU (164) coupled to the first actuator (158) to raise and lower the left section (144), and coupled to the second actuator (160) to raise and lower the right section (148);
- a first load sensor (149) coupled to the ECU (164) and disposed to sense a first force acting rearwardly against the left section (144) and configured to generate a first signal indicative of the first force; and
- a second load sensor (151) coupled to the ECU (164) and disposed to sense a second force acting rearwardly against the right section (148) and configured to generate a second signal indicative of the second force;
- wherein the ECU (164) is configured to receive the first signal and the second signal and to responsively raise and lower the left section (144) and the right section (148) based at least on a magnitude of the first signal and the second signal.

2. The harvesting head height control circuit (162) of claim 1, wherein the harvesting head height control circuit (162) further comprises a first header height sensor (145, 147) that is configured to sense a first height of a portion of the articulated harvesting head (104) with respect to the agricultural field and to responsively generate a signal indicative of the first height.

3. The harvesting head height control circuit (162) of claim 2, wherein the ECU (164) is configured to control the first height of a portion of the articulated harvesting head to a commanded operating height.

4. The harvesting head height control circuit (162) of claim 3, wherein the ECU (164) automatically changes the commanded operating height based upon at least one of the first signal and the second signal.

5. The harvesting head height control circuit (162) of claim 4, wherein the ECU (164) is configured to increase the commanded operating height when at least one of the first signal and the second signal increases above a first threshold signal level.

6. The harvesting head height control circuit (162) of claim 4, wherein the ECU (164) is configured to maintain the commanded operating height at a predetermined commanded operating height when at least one of the first signal and the second signal is below a first threshold signal value.

7. The harvesting head height control circuit (162) of claim 6, further comprising an operator input device (143) that is configured to respond to operator actuation and to transmit the predetermined commanded operating height to the ECU (164).

8. The harvesting head height control circuit (162) of claim 5, wherein the ECU (164) is configured to stop forward travel of the combine harvester (102) when at least one of the first signal and the second signal increases above a second threshold signal level.

9. The harvesting head height control circuit (162) of claim 8, wherein the second threshold signal level is greater than the first threshold signal level.

10. The harvesting head height control circuit (162) of claim 8, wherein the ECU (164) is coupled to an operator display device (169), and further wherein the ECU (164) is configured to signal the operator display device (169) to display a message indicating that the combine harvester (102) has been stopped because at least one of the first signal and the second signal increased above the second threshold signal level.

* * * * *